United States Patent
Sasaki

(10) Patent No.: US 7,228,376 B2
(45) Date of Patent: Jun. 5, 2007

(54) RECORDING OF INFORMATION ON RECORDING MEDIUM HAVING TEMPORARY SPACE AREA

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 461 days.

(21) Appl. No.: 10/679,267

(22) Filed: Oct. 7, 2003

(65) Prior Publication Data

US 2004/0133739 A1 Jul. 8, 2004

(30) Foreign Application Priority Data

| Oct. 11, 2002 | (JP) | ............................. 2002-299335 |
| Oct. 23, 2002 | (JP) | ............................. 2002-308308 |
| Sep. 17, 2003 | (JP) | ............................. 2003-325195 |

(51) Int. Cl.
   *G06F 12/00* (2006.01)
(52) U.S. Cl. .................. 711/103; 369/47.14; 714/710; 714/718
(58) Field of Classification Search ................ 711/103; 714/710, 714, 6, 7, 718; 369/47.14
   See application file for complete search history.

(56) References Cited

U.S. PATENT DOCUMENTS

| 5,437,012 | A  | * | 7/1995  | Mahajan ...................... 711/111 |
| 6,304,986 | B1 | * | 10/2001 | Ma et al. ..................... 714/718 |
| 6,381,710 | B1 |   | 4/2002  | Kim |
| 7,080,296 | B2 | * | 7/2006  | Wu et al. .................... 714/710 |
| 7,151,725 | B2 | * | 12/2006 | Ijtsma et al. ............. 369/47.14 |
| 2001/0010085 | A1 |   | 7/2001  | Rafanello et al. |
| 2002/0009028 | A1 | * | 1/2002  | Ijtsma et al. ............. 369/47.14 |
| 2002/0024902 | A1 |   | 2/2002  | Sasaki |
| 2002/0060962 | A1 | * | 5/2002  | Kase ....................... 369/47.11 |
| 2002/0114245 | A1 |   | 8/2002  | Sasaki |

(Continued)

FOREIGN PATENT DOCUMENTS

EP     04100528 A   *   2/2004

(Continued)

OTHER PUBLICATIONS

"CD-RW Multimedia Command Set Modifications for the Mount Rainier RW Format," DRAFT Version 0.95, Internet Article, "Online!" Sep. 29, 2000.

(Continued)

*Primary Examiner*—Pierre-Michel Bataille
(74) *Attorney, Agent, or Firm*—Dickstein Shapiro LLP

(57) ABSTRACT

An apparatus for recording information includes an information recording unit which records data on a recording medium having a user data area for recording of user requested data and having a predetermined spare area for reallocating a defect present in the user data area, a data reallocating unit which reallocates data to the predetermined spare area, a temporary spare area recording unit which generates a temporary spare area in a portion of the user data area by copying the reallocated data from the predetermined spare area to the portion of the user data area, and an updating unit which updates the temporary spare area by copying the reallocated data from the predetermined spare area to another portion of the user data area in response to a data change in one of the temporary spare area and the predetermined spare area.

19 Claims, 9 Drawing Sheets

U.S. PATENT DOCUMENTS

| | | |
|---|---|---|
| 2002/0159353 A1 | 10/2002 | Sasaki |
| 2003/0033475 A1 | 2/2003 | Sasaki |
| 2003/0133369 A1 | 7/2003 | Sasaki |
| 2003/0163638 A1 | 8/2003 | Sasaki |
| 2003/0223338 A1 | 12/2003 | Sasaki |
| 2003/0237020 A1* | 12/2003 | Wu ............................... 714/7 |

FOREIGN PATENT DOCUMENTS

| | | | |
|---|---|---|---|
| EP | 01420403 A2 | * | 5/2004 |
| JP | 10-21552 | | 1/1998 |
| WO | WO2004/114306 A1 | * | 12/2004 |
| WO | WO2005/078721AA | * | 8/2005 |

OTHER PUBLICATIONS

"Technical Introduction to DVD+RW/+R," Internet Article, "Online!" Jul. 10, 2002.

"Mount Rainier Drag and Drop Data on CD-RW: The Mount Rainier Solution," Internet Article "Online!", Jul. 3, 2001.

Mitsumi Electronics Europe GMBH: "Mount Rainier: the Evolution in Exchangeable Media," Internet Article, "Online!"May 9, 2002.

Takashi Yokozeki et al., "A Virtual Optical Disk Method to Realize Rewritability and Revision Control on A Write-Once Optical Disk," Systems & Computers in Japan, Scripta Technica Journals, New York, US, vol. 21, No. 8, 1990, pp. 34-43.

* cited by examiner

RECORDING OF INFORMATION ON RECORDING MEDIUM HAVING TEMPORARY SPACE AREA

BACKGROUND OF THE INVENTION

1. Field of the Invention

The invention relates to an information recording apparatus which records information on a recording medium having a user data area and a spare area, and also relates to an information recording method, a program for recording information, a memory medium having the information recording program stored thereon, and an information recording system.

2. Description of the Related Art

The Mt. Rainier standard has been proposed as a format which adds a defect management function to the rewritable CD disk or the DVD disk. The Mt. Rainier standard offers a format which provides compatibility with the original record format of the CD-RW disk and the DVD+RW disk that are rerecordable while newly adding a defective management function.

In the following, a description will be given of the features of the Mt. Rainier standard.

(1) First Feature

The Mt. Rainier standard is characterized in that a defect management area and a spare area are positioned within the user data area of the conventional format.

Specifically, the defect management area resides both in a main table area (hereinafter referred to as an MTA) within the lead-in zone and in a secondary table area (hereinafter referred to as an STA) provided in the user data area of the conventional format.

Reallocated data are recorded on the spare area (hereinafter referred to as an SA) provided in the user data area of the conventional format.

With this provision, spare sectors are properly read by use of a particular driver (hereinafter called an MRW driver) even when a disk recorded by the Mt. Rainier format is inserted into a drive that does not support the Mr. Rainier standard (such a drive will hereinafter be referred to as conventional drive). This is because the defect management area and the spare area exist in the user data area, which is accessible by the conventional drive.

For example, a DVD+MRW disk, which is a DVD+RW disk recorded by the Mt. Rainier format, may be inserted into a conventional drive. Since the DVD+MRW disk is compatible with the conventional DVD+RW standard, the conventional drive detects the insertion of the DVD+RW disk, and reports this to a user. In response to the report that a DVD+RW disk has been inserted, a MRW driver reads a predetermined address in the disk to find that a DVD+MRW disk is actually inserted. This is because the Mt. Rainier standard prescribes that information indicative of the Mt. Rainier disk be recorded at the predetermined address in the user data area. Upon finding that the DVD+MRW disk is inserted, the MRW driver reads the defect management area recorded at a predetermined position within the user data area, thereby obtaining information about spare sectors.

The spare area also resides in the user data area. In response to a data-read request from the user, the MRW driver identifies a relevant spare area based on the defect management information if the data-read request includes a request for access to a defect area, and requests the conventional drive to read the relevant spare area. In this manner, the conventional drive can properly read the DVD+MRW disk that contains spare sectors. If the drive supports the DVD+MRW format (such a drive will hereinafter be referred to as an MRW drive), it can properly read spare sectors without the use of such MRW driver as described above.

The difference between DVD+MRW and CD-MRW, which is the Mt. Rainier standard for CD-RW, is in the arrangement of SAs. Both CD-MRW and DVD+MRW have their spare areas in the user data area. While CD-MRW has its spare areas dispersed in the user data area, DVD+MRW has its spare areas concentrated in the innermost circumference and the outermost circumference of the user data area. An SA in the innermost circumference of the user data area is referred to as an SA1, and an SA in the outermost circumference is referred to as an SA2.

(2) Second Feature

Another feature of the Mt. Rainier standard is background formatting. In the background formatting, a user making a formatting request is notified of a formatting completion message after recording only a portion of the lead-in zone. The remaining portions are recorded with dummy data when there is no access from the user. After receiving the formatting completion message, the user can record or reproduce data on a random-access basis with respect to all the user data area on the disk.

Moreover, it is possible to take a disk out during the background formatting before the recording of all the disk area is completed. When a disk is ejected during the background formatting, it is necessary for the conventional drive to properly read the disk having only a partial formatting. To this end, dummy data is recorded on unrecorded areas intervening between recorded data. Further, the outermost address (i.e., the last written address LWA) recorded with user data or recorded by formatting is used as a start position from which a temporary STA (hereinafter referred to as a TSTA) is recorded, for the purpose of allowing the MRW driver to obtain defect management information. At the end, a temporary lead-out (hereinafter referred to as a TLO) is recorded, followed by the ejection of the disk.

A DVD+MRW disk, for which reallocation to the SA2 is made after a defect is found during the formatting operation, may be taken out. In such a case, a temporary SA2 (hereinafter referred to as a TSA2) is set aside from the LWA, and spared data is then copied to the SA2, followed by recording the TSTA and the TLO. This is done for the purpose of shortening a time required for the ejection of the disk. That is, since the SA2 in DVD+MRW is located at the outermost circumference of the user data area, the process of inserting dummy data into the unrecorded areas up to the SA2 is omitted for the purpose of time saving. The TSA2 is a temporary spare area for use by the conventional drive to read the reallocated data. The size of the TSA2 is a sum of all the areas used for the spare purpose in the SA2.

(3) Example

FIGS. 7A and 7B are illustrative drawings showing the recording format of CD-MRW and DVD+MRW. FIG. 7A illustrates the recording format of CD-MRW, and FIG. 7B is the recording format of DVD+MRW.

Both CD-MRW and DVD+MRW are divided into a lead-in zone, a data zone, and a lead-out zone.

An MTA (main table area) is provided in the lead-in zone.

A GAA (general application area), an SA (spare area), a DA (data area), and an STA (secondary table area) are provided in the data zone. In the Mt. Rainier format, defect management information and information about the formatting status are recorded on the MTA and STA. The STA is a copy of what is stored in the MTA, and is situated in the data zone. User data is recorded on the DA. If a defect is found in the DA during the recording of data, reallocation to the SA is carried out. Further, the GAA stores information for use by an MRW driver to identify a MRW disk when a MRW disk is inserted into a conventional drive.

In this manner, MRW arranges an STA as a defect management area and an SA as a spare area in the data zone which is accessible by a conventional drive, thereby providing for the conventional drive to read the spare area.

The difference between CD-MRW and DVD+MRW resides in the arrangement of SA areas. CD-MRW disperses the SAs and the DAs sparsely as shown in FIG. 7A, whereas DVD+MRW arranges the SA1 at the innermost circumference of the data zone and the SA2 at the outermost circumference as shown in FIG. 7B. As a result, the DAs which record user data are contiguous.

FIGS. 8A and 8B are illustrative drawings showing the way CD-MRW and DVD+MRW are partially formatted. FIG. 8A illustrates the recording format of CD-MRW, and FIG. 8B is the recording format of DVD+MRW.

In CD-MRW, a TSTA (temporary secondary table area) is recorded following a user-recorded area or an area recorded by formatting with dummy data, and a TLO (temporary lead-out) is added. MTA information is copied to the TSTA, storing defect management information and information about formatting status. An MRW driver refers to the TSTA to acquire spare information. Since SAs are sparsely dispersed in CD-MRW, a defect that is detected in an i-th DA area during the background formatting is generally replaced by an i-th SA area.

In the case of DVD+MRW, on the other hand, spare areas exist only in the SA1 and the SA2. The SA2 may thus be used during the background formatting. If the SA2 is used, it is necessary to insert dummy data all the way from the position where formatting is done to the position of the SA2 so as to allow a conventional drive to read the data reallocated to the SA2. Since the SA2 is situated at the very end of the user data area, however, a disk cannot be taken out until formatting is complete if the SA2 is used as a replacement. In order to avoid this in DVD+MRW, as shown in FIG. 8B, data spared by (i.e., reallocated to) the SA2 is copied to the TSA2 (temporary SA2) following the formatted area. The disk is then ejected after recording the TSTA and the TLO following the TSA2.

In FIGS. 8A and 8B, "De-iced" represents areas where data is recorded. That is, "iced" indicates unrecorded areas, and "De-iced" means eliminating unrecorded areas.

(4) Art Disclosed in Publication

Japanese Patent Application Publication No. 10-021552 discloses an information recording apparatus that records spared data on the user data area. This information recording apparatus sets aside a portion of the user data area as a spare area if a large number of defect areas may exist depending on the conditions of the disk. The set-aside portion of the user data area will then be used as a spare area.

When the Mt. Rainier standard is employed, adding data to a partially formatted DVD+MRW gives rise to the following problems. FIGS. 9A through 9D are illustrative drawings for explaining problems that occur in DVD+MRW.

FIGS. 9A through 9D illustrate a case in which the updating of a TSA2 becomes necessary in DVD+MRW. FIG. 9A shows a partially formatted DVD+MRW. In FIG. 9A, data spared by (i.e., reallocated to) the SA2 is copied to a TSA2 following the formatted area, followed by the recorded TSTA and TLO.

(1) First Problem

Since the TSA2 resides in the user data area, as illustrated in FIG. 9B, there may be a case in which the TSA2 is overwritten by user data.

Here, a drive is configured to resume background formatting if the TSTA and the TLO, which exist in the user data area, are similarly overwritten by user data. Once the formatting resumes, a TSA2, a TSTA, and a TLO will again be recorded from the new LWA at the time of disk discharge. This prevents these areas from being destroyed by the overwriting user data.

However, no consideration is given to the fact that a TSA2 may be overwritten by user data. When a TSA2 is overwritten by user data, therefore, the TSA2 will not be rerecorded by the resumed background formatting or the like. Because of this, if a TSA2 is overwritten by user data as illustrated in FIG. 9B, the TSA2 will be left overwritten. When a disk having a TSA2 overwritten by user data is inserted into a conventional drive, the drive gives incorrect spare data to the user. Namely, when a TSA2 is overwritten by user data during the process of adding user data to a partially formatted disk, the TSA2 will no longer correctly represent the information of the SA2. If such a disk is inserted in a conventional drive, incorrect information will be given to a user.

(2) Second Problem

There may be a case in which a user wishes to store data in an area replaced by the SA2. In this case, as shown FIG. 9C, the data in the SA2 is updated.

While the TSA2 is provided for a conventional drive to read reallocated data, an MRW drive accesses the SA2 to record data on the SA2. As a result, the SA2 and the TSA2 end up storing different data.

In this manner, the SA2 may be updated during the process of adding user data to a partially formatted disk, resulting in a situation where the TSA2 does not correctly reflect data in the SA2. If such a disk is inserted into a conventional drive, incorrect information will be given to a user.

(3) Third Problem

A problem may also arise when a new defect is found during the recording of user data.

As previously described, the size of a TSA2 is only as big as a sum of all the areas actually used for replacement in the SA2. As shown in FIG. 9D, thus, a problem may be encountered in that there are no more areas for recording data that are newly found to be spared.

Accordingly, there is a need for a scheme by which a temporary spare area (e.g., a TSA2) correctly reflect data stored in the spare area (e.g., the SA2) even if a user records data in the temporary spare area in a recording medium such as a partially formatted DVD+MRW.

Further, there is a need for a scheme by which a temporary spare area (e.g., a TSA2) correctly reflect data stored in the spare area (e.g., the SA2) even if the temporary spare area or the spare area is overwritten in a recording medium such as a partially formatted DVD+MRW.

SUMMARY OF THE INVENTION

It is a general object of the present invention to provide an information recording scheme that substantially obviates one or more problems caused by the limitations and disadvantages of the related art.

It is another and more specific object of the invention to provide an information recording scheme by which a temporary spare area correctly reflects data stored in the spare area even if a user records data in the temporary spare area in a recording medium such as a partially formatted DVD+MRW.

It is yet another object of the invention to provide an information recording scheme by which a temporary spare area correctly reflects data stored in the spare area even if the temporary spare area or the spare area is overwritten in a recording medium such as a partially formatted DVD+MRW.

To achieve the above objects, an apparatus for recording information includes an information recording unit which records data on a recording medium having a user data area for recording of user requested data and having a predetermined spare area for reallocating a defect present in the user data area, a data reallocating unit which reallocates data to the predetermined spare area, a temporary spare area recording unit which generates a temporary spare area in a portion of the user data area by copying the reallocated data from the predetermined spare area to the portion of the user data area, and an updating unit which updates the temporary spare area by copying the reallocated data from the predetermined spare area to another portion of the user data area in response to a data change in one of the temporary spare area and the predetermined spare area.

In this manner, the reallocated data of the predetermined spare area is newly copied to a portion of the user data area when a data change occurs in the temporary spare area or in the predetermined spare area. This makes it possible to update the temporary spare area such that the temporary spare area always stores the correct reallocated data.

According to one aspect of the invention, the updating unit includes a first updating unit which updates the temporary spare area when the data change is caused by overwriting of the temporary spare area by user data.

In this manner, the reallocated data of the predetermined spare area is newly copied to a portion of the user data area when the temporary spare area is overwritten by user data. This makes it possible to update the temporary spare area such that the temporary spare area always stores the correct reallocated data.

According to one aspect of the invention, the updating unit includes a second updating unit which updates the temporary spare area when the data change is caused by recording on the predetermined spare area to which a recording area requested by a user has been reallocated.

In this manner, the reallocated data of the predetermined spare area is newly copied to a portion of the user data area when the predetermined spare area is updated by recording on the predetermined spare area. This makes it possible to update the temporary spare area such that the temporary spare area always stores the correct reallocated data.

According to one aspect of the invention, the updating unit includes a second updating unit which updates the temporary spare area when the data change is caused by recording on the predetermined spare area in response to a detection of a defect in the user data area.

In this manner, the reallocated data of the predetermined spare area is newly copied to a portion of the user data area when the predetermined spare area is updated in response to a detection of a defect in the user data area. This makes it possible to update the temporary spare area such that the temporary spare area always stores the correct reallocated data.

According to one aspect of the invention, the recording medium is one that complies with a DVD+MRW standard, the predetermined spare area being a Spare Area 2 and the temporary spare area being a Temporary Spare Area 2, wherein the updating unit newly records the Temporary Spare Area 2 following a last written address in response to the data change in the Temporary Spare Area 2, followed by recording a Temporary Secondary Table Area and a Temporary Lead Out.

In this manner, the invention is applied to an information recording medium complying with the DVD+MRW standard.

According to one aspect of the invention, the recording medium is one that complies with a DVD+MRW standard, the predetermined spare area being a Spare Area 2 and the temporary spare area being a Temporary Spare Area 2, wherein the updating unit newly records the Temporary Spare Area 2 following a last written address in response to the data change in the Spare Area 2, followed by recording a Temporary Secondary Table Area and a Temporary Lead Out.

In this manner, the invention is applied to an information recording medium complying with the DVD+MRW standard.

According to one aspect of the invention, the updating unit updates the temporary spare area in response to a user request for ejection of the recording medium.

In this manner, the temporary spare area is updated only when the recording medium is to be ejected, thereby preventing the updating of the temporary spare area from lowering the performance of a user request for data recording. Further, the ejected recording medium has the data of the temporary spare area that is correctly recorded. This insures that a conventional drive can properly read the reallocated data.

According to one aspect of the invention, the updating unit updates the temporary spare area in response to a user request for formatting suspension.

In this manner, the temporary spare area is updated only when a user request for formatting suspension is issued, thereby preventing the updating of the temporary spare area from lowering the performance of a user request for data recording. Further, the ejected recording medium has the data of the temporary spare area that is correctly recorded. This insures that a conventional drive can properly read the reallocated data.

According to one aspect of the invention, an apparatus for recording information includes an information recording unit which records data on a recording medium having a user data area for recording of user requested data and having a predetermined spare area for reallocating a defect present in the user data area, a background formatting unit which carries out formatting of the recording medium in a background, a background formatting resumption unit which resumes the background formatting when the recording medium is partially formatted, a data reallocating unit which reallocates data to the predetermined spare area, a temporary spare area recording unit which generates a temporary spare area in a portion of the user data area by copying the reallocated data from the predetermined spare area to the portion of the user data area, and a resuming unit which resumes the formatting in response to a data change in one of the temporary spare area and the predetermined spare area.

It is possible that the power of the information recording apparatus (drive) is shutdown without ejecting the recording medium (optical disk) after the temporary spare area (TSA2) is overwritten by user data or after the predetermined spare area (SA2) is updated. In such a case, the temporary spare area (TSA2) fails to be updated, leaving the reallocated data incorrectly recorded. In order to obviate this problem, background formatting is resumed when the updating of the temporary spare area (TSA2) becomes necessary. When a recording medium (optical disk) partially formatted in DVD+MRW is inserted, the host apparatus monitoring formatting status is supposed to suspend background formatting if a user request for disk ejection or a request for PC power shutdown is made during the background formatting. Namely, if the background formatting is resumed at the time the user records data in the temporary spare area (TSA2), for example, the host apparatus needs to monitor a user request for disk ejection or a request for PC power shutdown, thereby issuing a request for formatting suspension to the information recording apparatus (drive) as such a need arises. Accordingly, it suffices for the information recording apparatus (drive) to update the temporary spare area (TSA2) at the timing the request for formatting suspension is received. If there is no request for formatting suspension, data will be recorded up to the position of the predetermined spare area (SA2), which insures that the recording medium (optical disk) is ejected with correct reallocated data. In this manner, the invention resumes background formatting when the updating of the temporary spare area or the predetermined spare area becomes necessary, thereby preventing the recording medium from having incorrect reallocated data recorded in the temporary spare area due to the power down of the drive without updating the temporary spare area.

According to one aspect of the invention, the resuming unit includes a first resuming unit which resumes the formatting when the data change is caused by overwriting of the temporary spare area by user data.

In this manner, background formatting is resumed when the temporary spare area is overwritten by user data, thereby preventing the recording medium from having incorrect reallocated data recorded in the temporary spare area due to the power down of the drive without updating the temporary spare area.

According to one aspect of the invention, the resuming unit includes a second resuming unit which resumes the formatting when the data change is caused by recording on the predetermined spare area to which a recording area requested by a user has been reallocated.

In this manner, background formatting is resumed when the predetermined spare area is updated by recording on the predetermined spare area, thereby preventing the recording medium from having incorrect reallocated data recorded in the temporary spare area due to the power down of the drive without updating the temporary spare area.

According to one aspect of the invention, the resuming unit includes a second resuming unit which resumes the formatting when the data change is caused by recording on the predetermined spare area in response to a detection of a defect in the user data area.

In this manner, background formatting is resumed when the predetermined spare area is updated in response to a detection of a defect in the user data area, thereby preventing the recording medium from having incorrect reallocated data recorded in the temporary spare area due to the power down of the drive without updating the temporary spare area.

According to one aspect of the invention, the recording medium is one that complies with a DVD+MRW standard, the predetermined spare area being a Spare Area 2 and the temporary spare area being a Temporary Spare Area 2, wherein the resuming unit resumes the formatting in response to the data change in the Temporary Spare Area 2.

In this manner, the invention is applied to an information recording medium complying with the DVD+MRW standard.

According to one aspect of the invention, the recording medium is one that complies with a DVD+MRW standard, the predetermined spare area being a Spare Area 2 and the temporary spare area being a Temporary Spare Area 2, wherein the resuming unit resumes the formatting in response to the data change in the Spare Area 2.

In this manner, the invention is applied to an information recording medium complying with the DVD+MRW standard.

According to one aspect of the invention, a method of recording information includes an information recording step of recording data on a recording medium having a user data area for recording of user requested data and having a predetermined spare area for reallocating a defect present in the user data area, a data reallocating step of reallocating data to the predetermined spare area, a temporary spare area recording step of generating a temporary spare area in a portion of the user data area by copying the reallocated data from the predetermined spare area to the portion of the user data area, and an updating step of updating the temporary spare area by copying the reallocated data from the predetermined spare area to another portion of the user data area in response to a data change in one of the temporary spare area and the predetermined spare area.

In this manner, the reallocated data of the predetermined spare area is newly copied to a portion of the user data area when a data change occurs in the temporary spare area or in the predetermined spare area. This makes it possible to update the temporary spare area such that the temporary spare area always stores the correct reallocated data.

According to one aspect of the invention, a method of recording information includes an information recording step of recording data on a recording medium having a user data area for recording of user requested data and having a predetermined spare area for reallocating a defect present in the user data area, a background formatting step of carrying out formatting of the recording medium in a background, a background formatting resumption step of resuming the background formatting when the recording medium is partially formatted, a data reallocating step of reallocating data to the predetermined spare area, a temporary spare area recording step of generating a temporary spare area in a portion of the user data area by copying the reallocated data from the predetermined spare area to the portion of the user data area, and a resuming step of resuming the formatting in response to a data change in one of the temporary spare area and the predetermined spare area.

It is possible that the power of the information recording apparatus (drive) is shutdown without ejecting the recording medium (optical disk) after the temporary spare area (TSA2) is overwritten by user data or after the predetermined spare area (SA2) is updated. In such a case, the temporary spare area (TSA2) fails to be updated, leaving the reallocated data incorrectly recorded. In order to obviate this problem, background formatting is resumed when the updating of the temporary spare area (TSA2) becomes necessary. When a recording medium (optical disk) partially formatted in DVD+MRW is inserted, the host apparatus monitoring formatting status is supposed to suspend background formatting if a user request for disk ejection or a request for PC power shutdown is made during the background formatting. Namely, if the background formatting is resumed at the time the user records data in the temporary spare area (TSA2), for example, the host apparatus needs to monitor a user request for disk ejection or a request for PC power shutdown, thereby issuing a request for formatting suspension to the information recording apparatus (drive) as such a need arises. Accordingly, it suffices for the information recording apparatus (drive) to update the temporary spare area (TSA2) at the timing the request for formatting suspension is received. If there is no request for formatting suspension, data will be recorded up to the position of the predetermined spare area (SA2), which insures that the recording medium (optical disk) is ejected with correct reallocated data. In this manner, the invention resumes background formatting when the updating of the temporary spare area or the predetermined spare area becomes necessary, thereby preventing the recording medium from having incorrect reallocated data recorded in the temporary spare area due to the power down of the drive without updating the temporary spare area.

According to one aspect of the invention, a computer-readable record medium having a program embodied therein for causing a computer to record information, the program comprising an information recording unit which records data on a recording medium having a user data area for recording of user requested data and having a predetermined spare area for reallocating a defect present in the user data area, a data reallocating unit which reallocates data to the predetermined spare area, a temporary spare area recording unit which generates a temporary spare area in a portion of the user data area by copying the reallocated data from the predetermined spare area to the portion of the user data area, and an updating unit which updates the temporary spare area by copying the reallocated data from the predetermined spare area to another portion of the user data area in response to a data change in one of the temporary spare area and the predetermined spare area.

According to one aspect of the invention, a computer-readable record medium having a program embodied therein for causing a computer to record information, the program comprising an information recording unit which records data on a recording medium having a user data area for recording of user requested data and having a predetermined spare area for reallocating a defect present in the user data area, a background formatting unit which carries out formatting of the recording medium in a background, a background formatting resumption unit which resumes the background formatting when the recording medium is partially formatted, a data reallocating unit which reallocates data to the predetermined spare area, a temporary spare area recording unit which generates a temporary spare area in a portion of the user data area by copying the reallocated data from the predetermined spare area to the portion of the user data area, and a resuming unit which resumes the formatting in response to a data change in one of the temporary spare area and the predetermined spare area.

According to one aspect of the invention, a system for recording information includes an information recording apparatus which records data on a recording medium having a user data area for recording of user requested data and having a predetermined spare area for reallocating a defect present in the user data area, and a host apparatus which instructs the information recording apparatus to record data on the recording medium, wherein the information recording apparatus and the host apparatus together include an information recording unit which records data on the recording medium, a data reallocating unit which reallocates data to the predetermined spare area, a temporary spare area recording unit which generates a temporary spare area in a portion of the user data area by copying the reallocated data from the predetermined spare area to the portion of the user data area, and an updating unit which updates the temporary spare area by copying the reallocated data from the predetermined spare area to another portion of the user data area in response to a data change in one of the temporary spare area and the predetermined spare area.

According to one aspect of the invention, a system for recording information includes an information recording apparatus which records data on a recording medium having a user data area for recording of user requested data and having a predetermined spare area for reallocating a defect present in the user data area, and a host apparatus which instructs the information recording apparatus to record data on the recording medium, wherein the information recording apparatus and the host apparatus together include an information recording unit which records data on the recording medium, a background formatting unit which carries out formatting of the recording medium in a background, a background formatting resumption unit which resumes the background formatting when the recording medium is partially formatted, a data reallocating unit which reallocates data to the predetermined spare area, a temporary spare area recording unit which generates a temporary spare area in a portion of the user data area by copying the reallocated data from the predetermined spare area to the portion of the user data area, and a resuming unit which resumes the formatting in response to a data change in one of the temporary spare area and the predetermined spare area.

According to one aspect of the invention, a program for causing a computer to record information includes an information recording unit which records data on a recording medium having a user data area for recording of user requested data and having a predetermined spare area for reallocating a defect present in the user data area, a data reallocating unit which reallocates data to the predetermined spare area, a temporary spare area recording unit which generates a temporary spare area in a portion of the user data area by copying the reallocated data from the predetermined spare area to the portion of the user data area, and an updating unit which updates the temporary spare area by copying the reallocated data from the predetermined spare area to another portion of the user data area in response to a data change in one of the temporary spare area and the predetermined spare area.

According to one aspect of the invention, a program for causing a computer to record information includes an information recording unit which records data on a recording medium having a user data area for recording of user requested data and having a predetermined spare area for reallocating a defect present in the user data area, a background formatting unit which carries out formatting of the recording medium in a background, a background formatting resumption unit which resumes the background formatting when the recording medium is partially formatted, a data reallocating unit which reallocates data to the predetermined spare area, a temporary spare area recording unit which generates a temporary spare area in a portion of the user data area by copying the reallocated data from the predetermined spare area to the portion of the user data area, and a resuming unit which resumes the formatting in response to a data change in one of the temporary spare area and the predetermined spare area.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 7A:
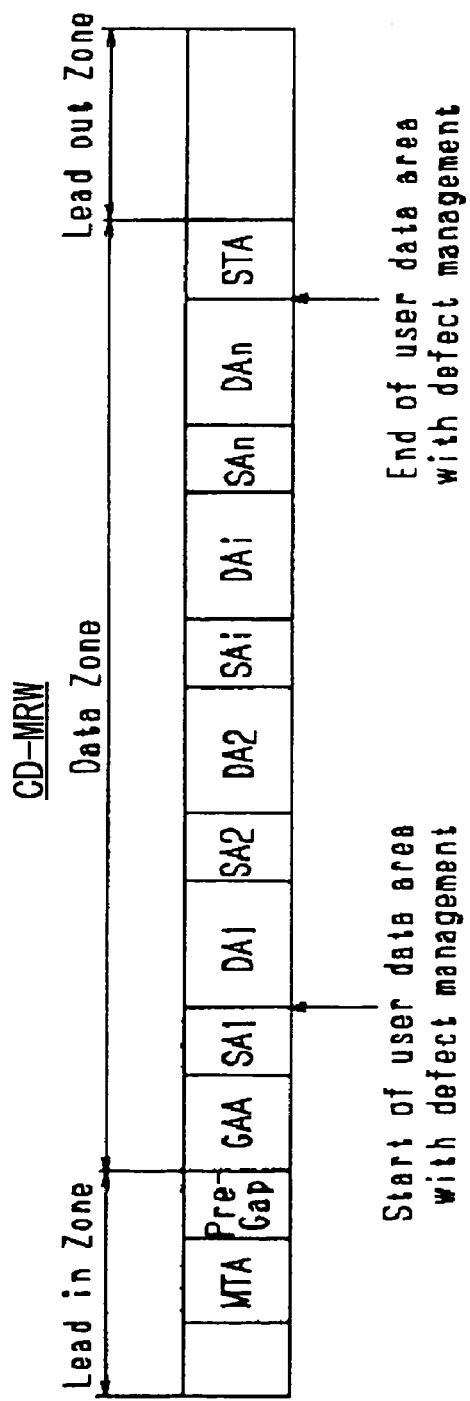
FIGS. 7A and 7B are illustrative drawings showing the recording format of CD-MRW and DVD+MRW.
Figure 7B:
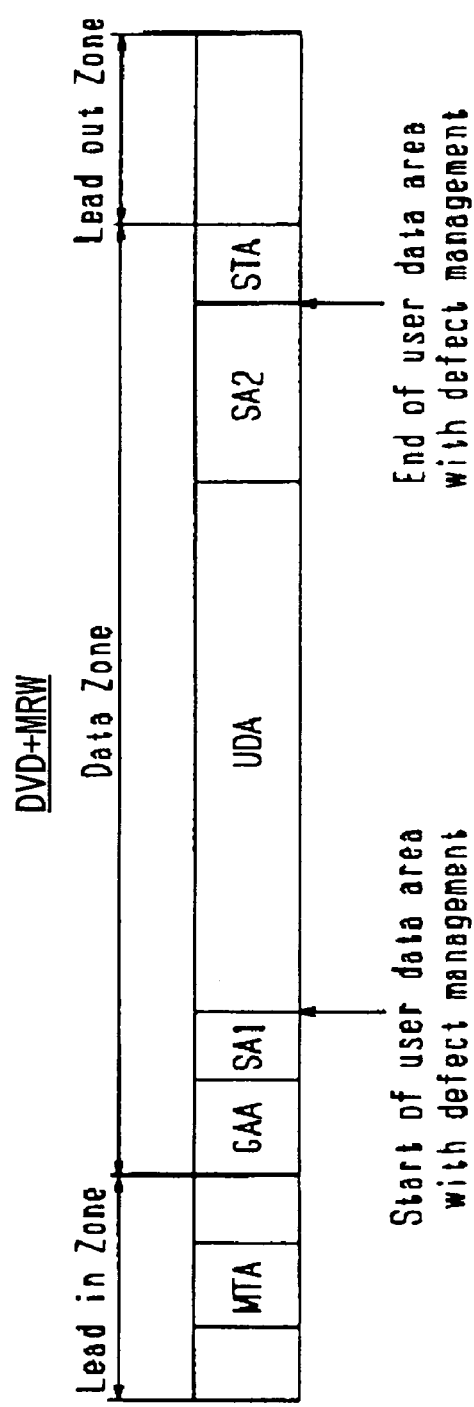
Figure 8A:
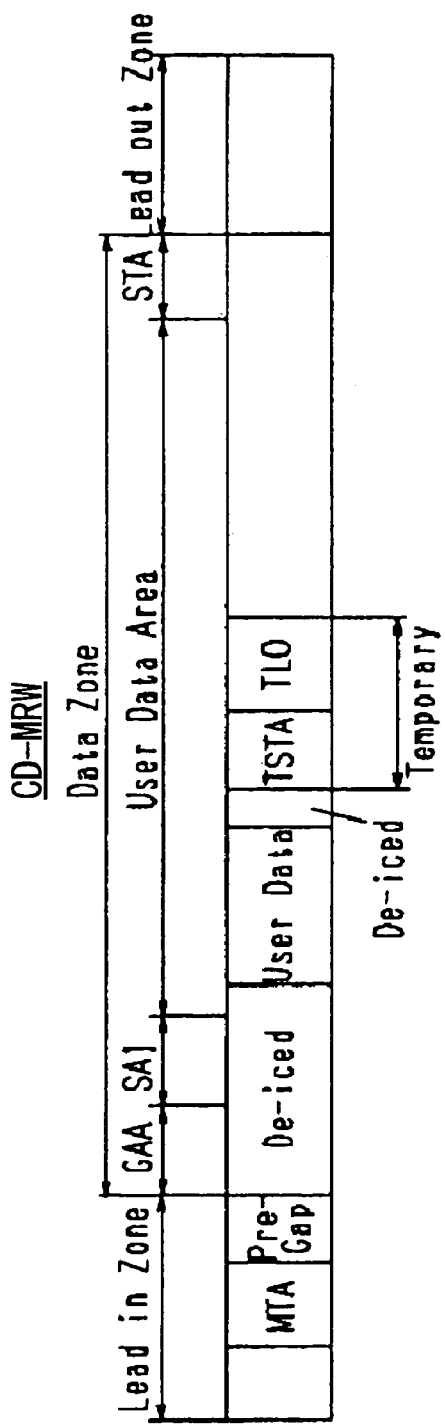
FIGS. 8A and 8B are illustrative drawings showing the way CD-MRW and DVD+MRW are partially formatted.

An embodiment of the invention will be described with reference to FIG. 1 through FIG. 6. In those figures, the same elements as those described with reference to FIG. 7 through FIG. 9 are referred to by the same numerals, and a description thereof will be omitted.

Figure 1:
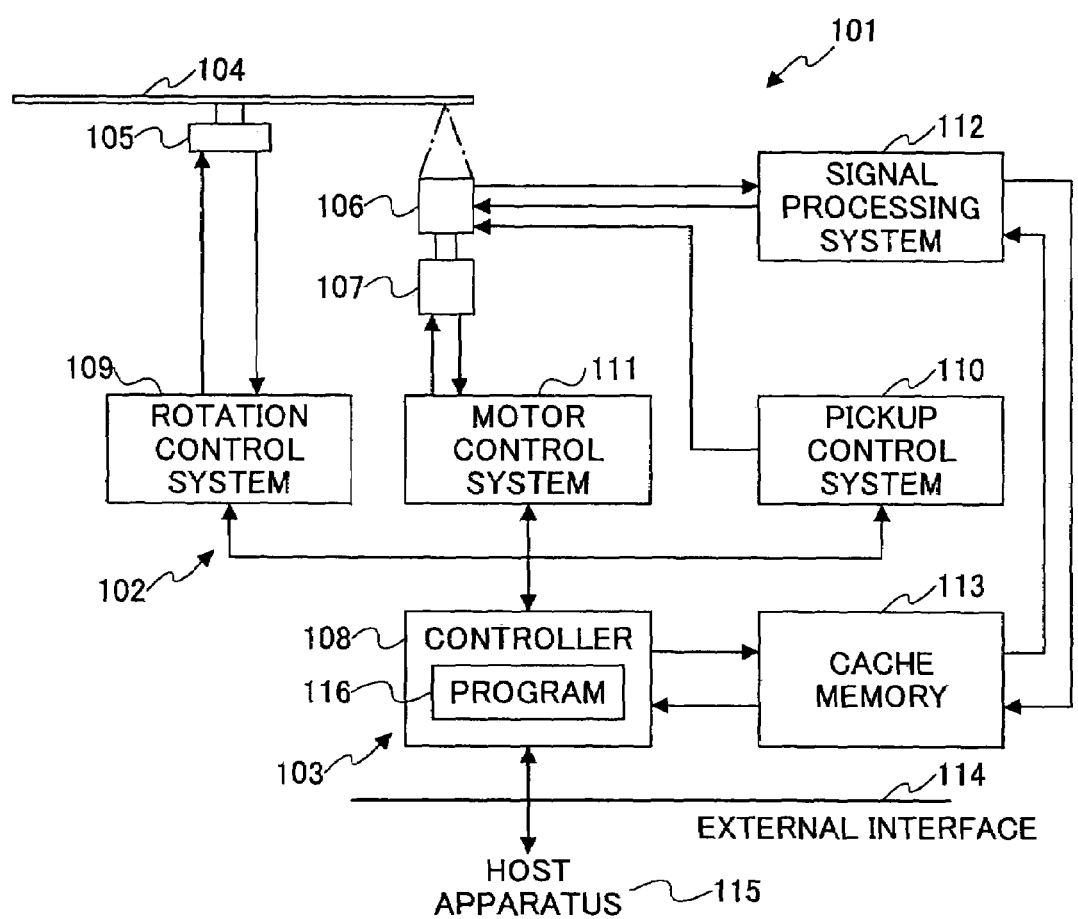
FIG. 1 is an illustrative drawing showing the construction of an optical disk drive according to the invention.

This embodiment relates to a case in which the information recording apparatus of the invention is applied to an optical disk drive. FIG. 1 is an illustrative drawing showing the construction of an optical disk drive.

As shown in FIG. 1, an optical disk drive 101 includes a drive unit 102 that is hardware resources for recording/reproducing information on/from an optical disk, and further includes a driver 103 of the drive unit 102. The drive unit 102 may not be an MRW drive unit but may a conventional drive unit 102. On the other hand, the driver 103 needs to be a driver that complies with the Mt. Rainier standard.

The drive unit 102 rotates an optical disk 104, which is an information recording medium such as DVD+MRW or DVD+RW, and shines a laser beam on the rotating optical disk 104 to perform the recording/reproducing of information. For this purpose, the drive unit 102 includes a motor 105 for rotating the optical disk 104, an optical pickup 106 for shining laser light on the optical disk 104, and a motor 107 for moving the optical pickup 106 in a radial direction of the optical disk 104. The drive unit 102 further includes a control system for controlling the components described above.

As a control system, the drive unit 102 has a controller 108 that attends to the central control of each component. The controller 108 controls a rotation control system 109, a pickup control system 110, a motor control system 111, and a signal processing system 112. The rotation control system 109 controls the operation of the motor 105, which drives and rotates the optical disk 104. The pickup control system 110 controls the operation of the optical pickup 106, which shines laser light on the optical disk 104. The motor control system 111 controls the operation of the motor 107, which moves the optical pickup 106 in a radial direction of the optical disk 104.

The signal processing system 112 uses an optical receiver device to detect laser light reflected by the optical disk 104 as the laser light is emitted by the optical pickup 106 under the control of the pickup control system 110, and processes the detected light signal. This signal processing system 112 stores data read from the optical disk 104 in a cache memory 113. The controller 108 transfers the data stored in the cache memory 113 to a host apparatus 115 connected through an external interface 114.

The rotation control system 109, the pickup control system 110, the motor control system 111, and the signal processing system 112, which constitute the above-mentioned control system, may be implemented as a digital circuit.

On the other hand, the controller 108 provided in the drive unit 102 is implemented by a microcomputer, for example, and includes an installed program 116 that serves as the driver 103 for information recording. Even if the program 116 for information recording is permanently stored on recording medium such as a ROM in the controller 108, for example, it may additionally be stored in a rewritable manner on a battery backup RAM, a nonvolatile memory, etc.

Figure 2A:
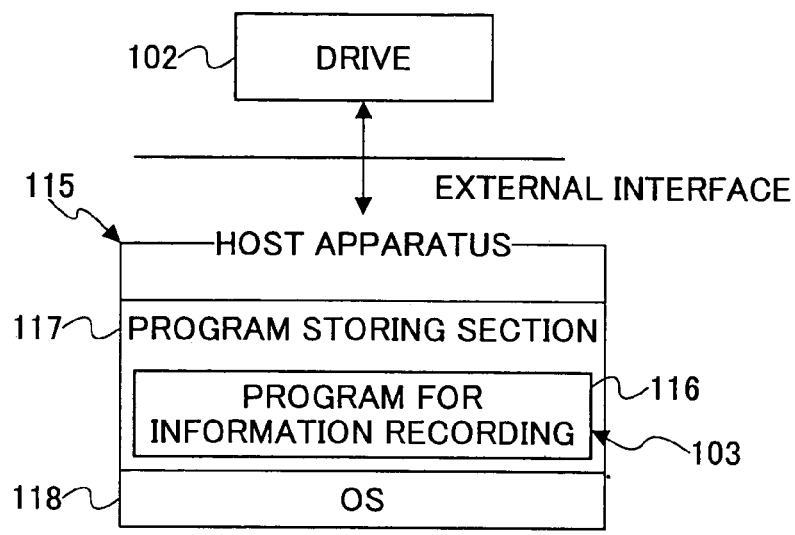
FIGS. 2A through 2C are illustrative drawings showing other examples of the storage of a driver of a drive unit.
Figure 2B:
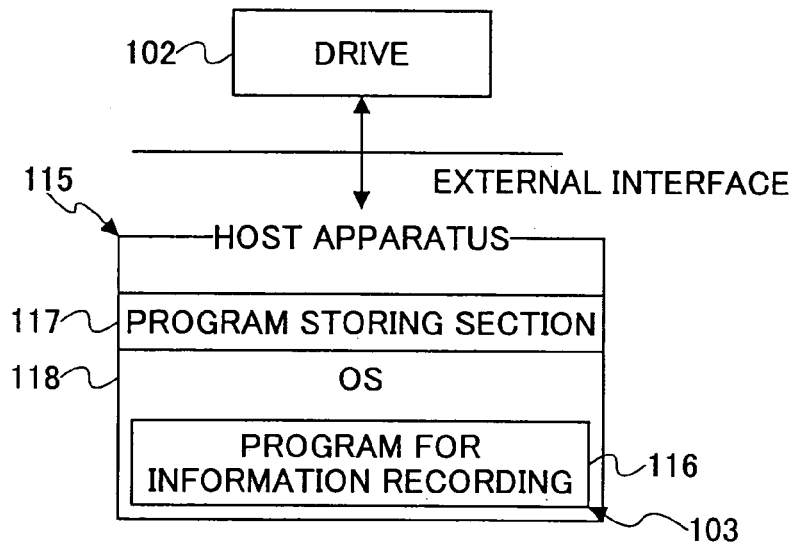
Figure 2C:
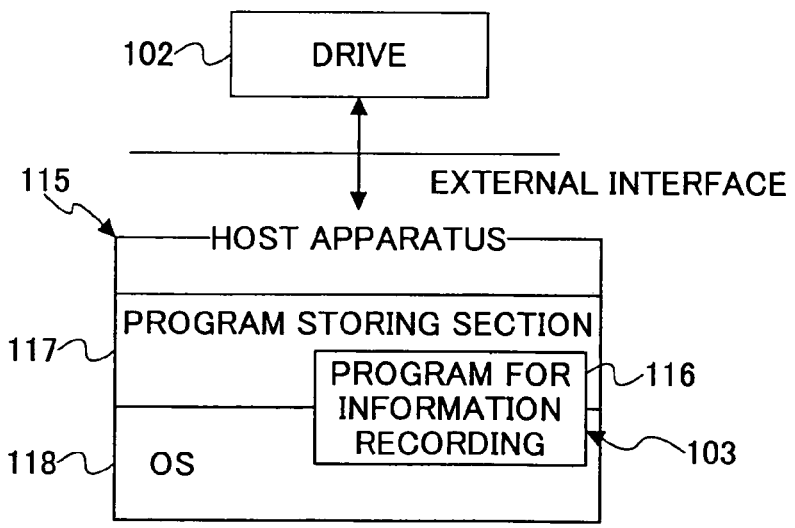

As another example of the storage of the driver 103 of the drive unit 102, the program 116 of the driver 103 for information recording may be installed in a program storing section 117 provided in the host apparatus 115, as shown in FIG. 2A. Alternatively, the program 116 may be provided as part of an OS 118 of the host apparatus 115 (refer to FIG. 2B), or may be partially included in the OS 118 of the host apparatus 115 (refer to FIG. 2C) In the configuration of the driver 103 of the drive unit 102 illustrated in FIGS. 2A through 2C, the drive unit 102 and the host apparatus 115 together make up an information recording system.

Basic Operation

In this configuration, the controller 108 controls and drives the drive unit 102 according to the program 116 of the driver 103 for information recording, thereby letting the optical pickup 106 irradiate the optical disk 104 with laser light. Data is thus recorded on the optical disk 104 serving as an information recording medium (corresponding to an information recording unit and an information recording step).

In the case of the driver 103 complying with the Mt. Rainier standard as in this embodiment, defect management information and information about formatting status are recorded in the MTA and the STA of the optical disk 104, which is DVD+MRW. The STA is a copy of what is stored in the MTA, and is arranged in the data zone. When a defect is detected in the DA during the recording of data, an area in which data is recorded is reallocated to the SA serving as a spare area (corresponding to a data reallocating unit, a data reallocating step).

In this manner, the STA serving as a defect management area and the SA serving as a spare area are arranged in the data zone which is accessible by the drive 102 having a conventional configuration, thereby providing for the conventional drive 102 to read the spare area.

The program 116 of the driver 103 for information recording in this embodiment further performs background formatting. In the background formatting, a user making a formatting request is notified of a formatting completion message after recording only a portion of the lead-in zone, and the remaining portions are recorded with dummy data when there is no access from the user (i.e., a background formatting unit and a background format step).

After receiving the formatting completion message, the user can record or reproduce data on a random-access basis with respect to all the user data area on the optical disk 104.

It is possible to take out the optical disk 104 during the background formatting before the recording of all the areas of the optical disk 104 is completed. When the optical disk 104 is ejected during the background formatting, it is necessary for the conventional drive to properly read the disk having only a partial formatting. To this end, the program 116 of the driver 103 for information recording stores dummy data in unrecorded areas intervening between recorded data. Further, the program 116 of the driver 103 for information recording records a TSTA from the position of the LWA that is recorded with user data or recorded by formatting, for the purpose of allowing the driver 103 to obtain defect management information. At the end, a TLO is recorded, followed by the ejection of the disk. Formatting may be resumed with respect the disk that is ejected halfway through formatting in this manner. When formatting is resumed, dummy data is recorded from the position of the LWA. These correspond to a background formatting resuming unit and a background formatting resuming step.

Figure 8B:
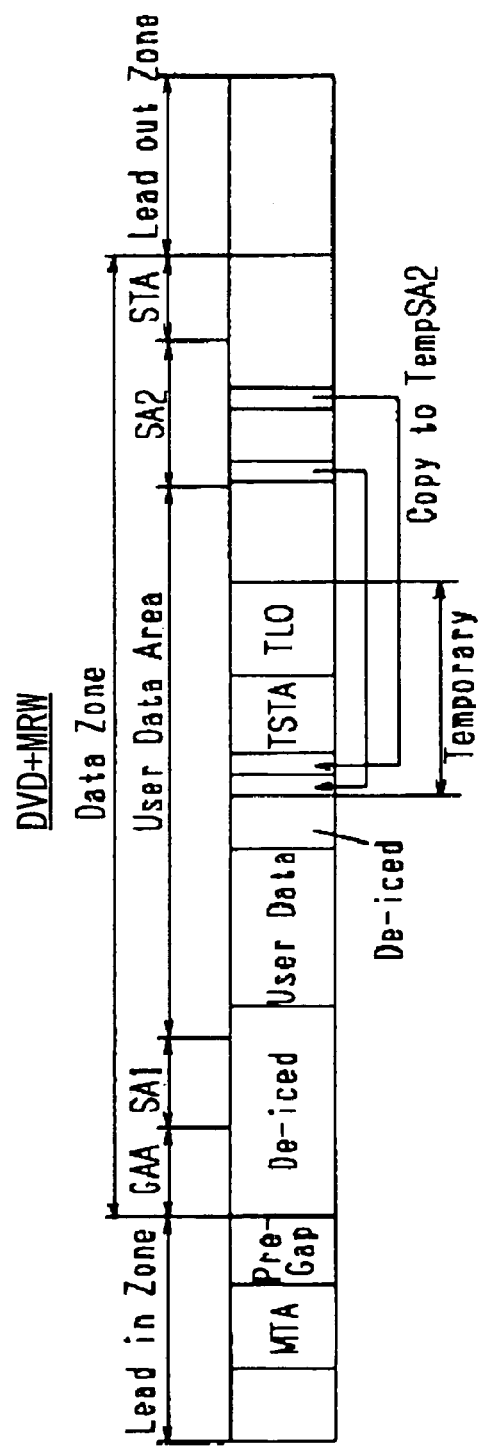
Figure 9A:
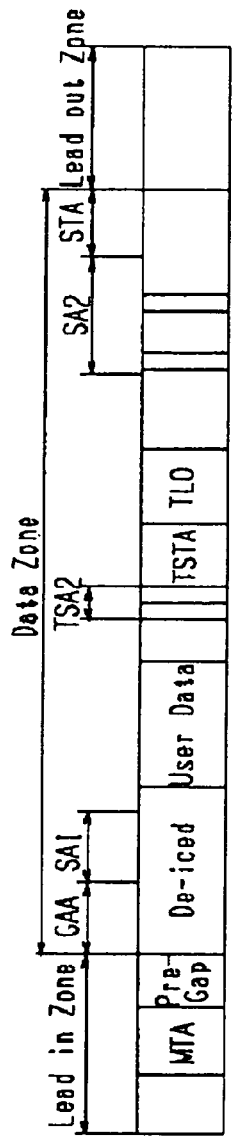
FIGS. 9A through 9D are illustrative drawings for explaining problems that occur in DVD+MRW.
Figure 9B:
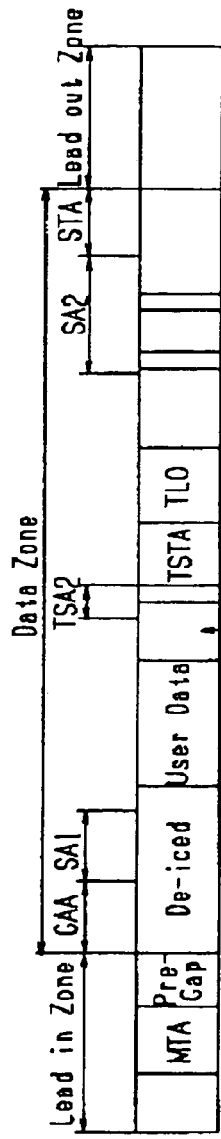
Figure 9C:
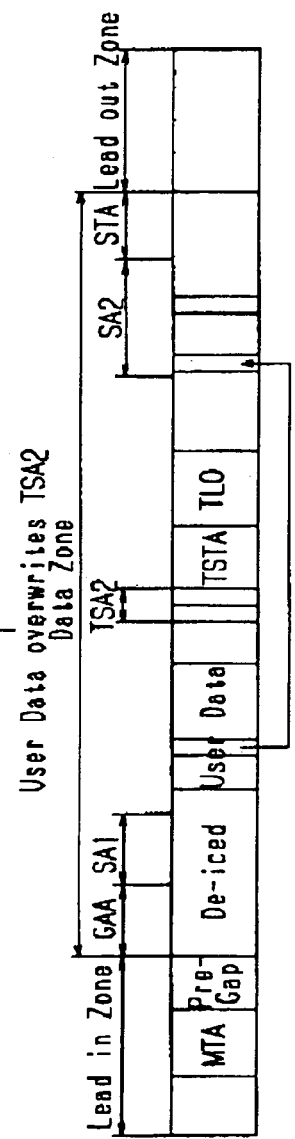
Figure 9D:
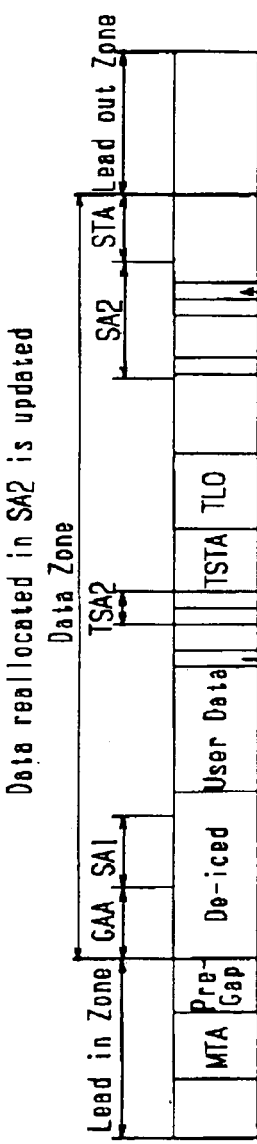

In the case of DVD+MRW, on the other hand, spare areas exist only in the SA1 and the SA2. The SA2 may thus be used during the background formatting. If the SA2 is used, it is necessary to insert dummy data all the way from the position where formatting is done to the position of the SA2 so as to allow the conventionally-configured drive 102 to read the data reallocated to the SA2. Since the SA2 is situated at the very end of the user data area, however, the optical disk 104 cannot be taken out until formatting is complete if the SA2 is used as a replacement. In order to avoid this in DVD+MRW, as shown in FIG. 8B, data spared by (i.e., reallocated to) the SA2 is copied to the TSA2 following the formatted area, and, then, the disk is ejected after recording the TSTA and the TLO following the TSA2 (i.e., a temporary spare area recording unit and a temporary spare area recording step).

Updating of Temporary Spare Area (TSA2)

Depending on various conditions as will be described, however, consistency between the SA2 and the TSA2 may not be maintained. In such a case, a user accessing the optical disk 104 may be given incorrect information. In this embodiment, the updating of the TSA2 is performed to obviate such a problem.

Updating of a TSA2 performed by the driver 103 according to this embodiment will be described with reference to FIGS. 3, 4, and 9. In the following, a description will be given by referring to a case in which a user records data in the TSA2.

Figure 3A:
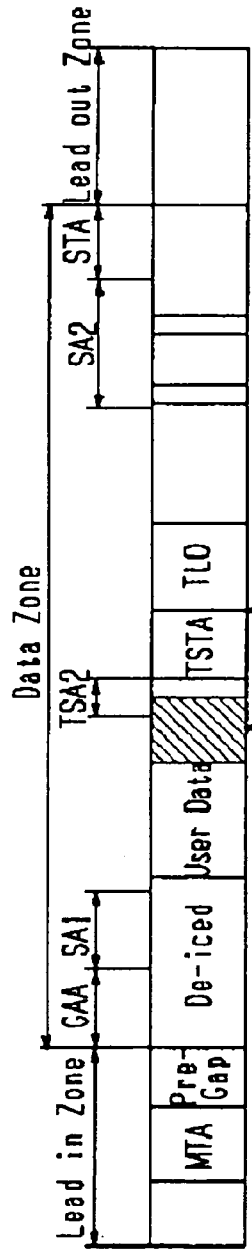
FIG. 3A is an illustrative drawing showing a case in which a TSA2 is overwritten as a result of the user recording of data in a partially formatted DVD+MRW optical disk.

FIG. 3A is an illustrative drawing showing a case in which a TSA2 is overwritten as a result of the user recording of data in the partially formatted optical disk 104 that is DVD+MRW. In FIG. 3A, a hatched region is an area that is overwritten, which partially covers the TSA2.

The TSA2 will be left overwritten. When the optical disk 104 having the TSA2 overwritten by user data is inserted into the conventional drive 102, the conventional drive 102 gives incorrect spare data to the user. Namely, when the TSA2 is overwritten by user data during the process of adding user data to the partially formatted optical disk 104, the TSA2 will no longer correctly represent the information of the SA2. If such an optical disk 104 is inserted in the conventional drive 102, incorrect information will be given to a user.

Figure 3B:
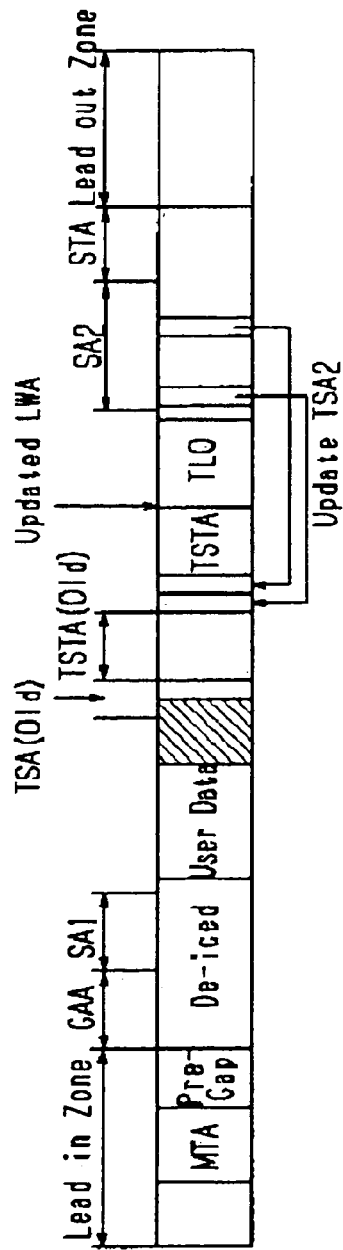
FIG. 3B is an illustrative drawing showing the updating of the TSA2.

In this embodiment, as shown in FIG. 3B, the controller 108 attends to processing according to the program 116 of the driver 103 for information recording. When the TSA2 is overwritten by user data, this processing records a TSA2 copied from the SA2 on the optical disk 104 from the position of the LWA at predetermined timing, and further records the TSTA and the TLO following the TSA2 (corresponding to a first updating unit).

This prevents the information of the TSA2 from being lost due to the overwriting user data even if the user records data in the TSA2.

Here, FIGS. 3A and 3B are provided to show a situation in which the TSA2 is overwritten by user data as a result of the user recording of data on the partially formatted optical disk 104 that is DVD+MRW. This embodiment successfully avoids a problem caused by such a situation that the TSA2 does not properly reflect the information of the SA2.

A situation in which the TSA2 does not correctly reflect the information of the SA2 is also brought about when the data of the SA2 is updated. Data of the SA2 may be updated when a user records data in the areas reallocated to the SA2 or when a new defect is found during the recording of user data.

In this embodiment, even when such a situation comes about, the controller 108 attends to processing according to the program 116 of the driver 103 for information recording. This processing records a TSA2 copied from the SA2 on the optical disk 104 from the position of the LWA at predetermined timing, and further records the TSTA and the TLO following the TSA2 (corresponding to a second updating unit).

This prevents a situation in which the TSA2 does not properly reflect the information of the SA2.

Figure 4:
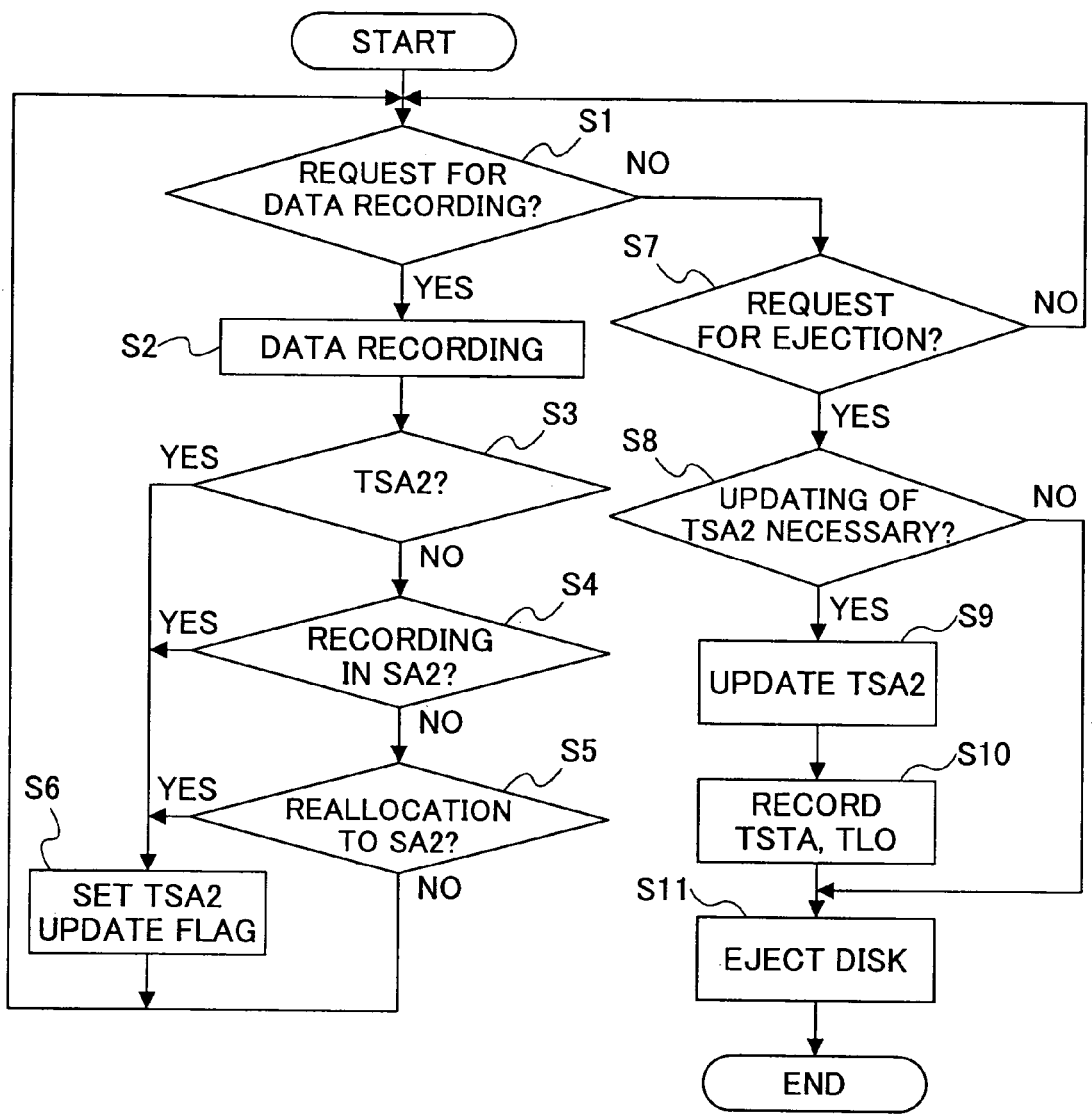
FIG. 4 is a flowchart showing a process of updating the TSA2 performed by a controller according to a driver program for information recording.

FIG. 4 is a flowchart showing a process of updating a TSA2 performed by the controller 108 according to the program 116 of the driver 103 for information recording. This process will be described in the following.

When a data recording request is issued from a user (step S1), data is recorded (step S2). If an area requested by the user for data recording is reallocated to the SA2, data is recorded in the SA2.

A check is then made as to whether the requested address is in the TSA2 (step S3). If it is in the TSA2, a TSA2 update flag is set (step S6).

If the check at step S3 finds that the requested address is not in the TSA2, a check is further made as to whether the requested address has been reallocated to the SA2 (step S4). If it has been reallocated to the SA2, the TSA2 update flag is set (step S6).

If the check at step S4 finds that the requested address has not been reallocated to the SA2, a check is further made as to whether recording on the requested address has brought about reallocation to the SA2 (step S5). If such reallocation to the SA2 has occurred, the TSA2 update flag is set (step S6).

If it is ascertained at step S1 that there is no data recording request from the user, a check is made as to whether a request for ejecting the optical disk 104 is made (step S7). If the request for ejecting the optical disk 104 has been made (Yes at step S7), it is checked whether the TSA2 update flag is in the set status (step S8). If the TSA2 update flag is not in the set status, the disk is discharged, and processing is brought to an end (step S11). If the TSA2 update flag indicates the set status, the TSA2 is newly recorded from the position of the LWA (step S9). Then, the TSTA and the TLO are recorded following the TSA2 (step S10) and the disk is discharged (step S11) prior to the closure of the processing.

In this embodiment as described above, the updating of a TSA2 is performed at timing when a request for ejecting the optical disk 104 is received from the user. This prevents the performance of a user request for data recording from being degraded due to the updating of the TSA2 serving as a temporary spare area.

Alternatively, as another example, the TSA2 may be updated at a time when a request for formatting suspension is issued. In this case, the check at step S7 for determining whether an eject request is made is replaced by a check for determining whether a request for formatting suspension is made.

Resuming of Background Formatting

According to this embodiment, when a user records data in the TSA2, the program 116 of the driver 103 for information recording resumes background formatting (corresponding to a first resuming unit).

Figure 3C:
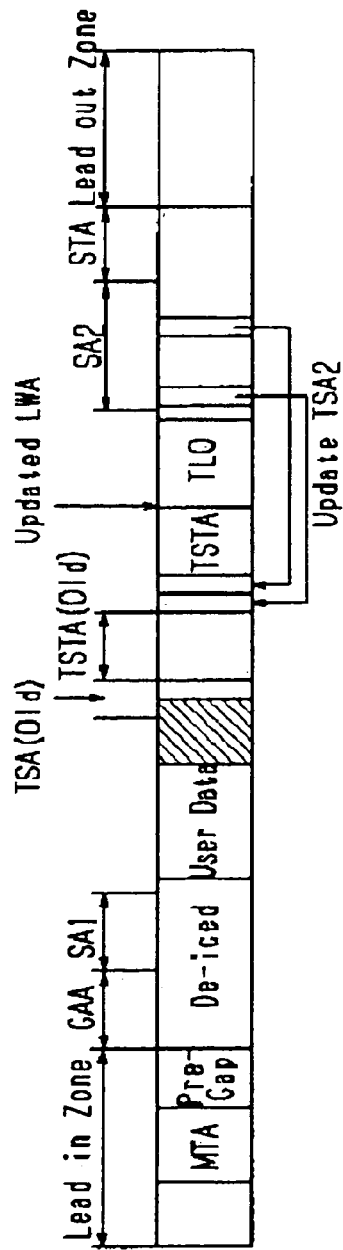
FIG. 3C is an illustrative drawing showing the resuming of background formatting that results in the recording of dummy data being started from the position of an LWA.

As shown in FIG. 3C, the resuming of background formatting results in the recording of dummy data being started from the position of the LWA (i.e., the TLO start address). When the optical disk 104 is to be taken out, the host apparatus 115 issues a request for formatting suspension. In response to the request for formatting suspension, the drive unit 102 starts recording a TSA2, a TSTA, and a TLO from the new LWA before the discharge of the optical disk 104. If there is no request for formatting suspension from a user, the SA2, the STA and the LO as would have been originally given will be recorded.

In this manner, the loss of the TSA2 information due to the overwriting user data can be prevented even when the user records data in the TSA2.

Here, FIG. 3C is provided to show a situation in which the TSA2 is overwritten by user data as a result of the user recording of data on the partially formatted optical disk 104 that is DVD+MRW. This embodiment successfully avoids a problem caused by such a situation that the TSA2 does not properly reflect the information of the SA2.

A situation in which the TSA2 does not correctly reflect the information of the SA2 is also brought about when the data of the SA2 is updated. Data of the SA2 may be updated when a user records data in the areas reallocated to the SA2 or when a new defect is found during the recording of user data.

In this embodiment, even when such a situation comes about, the controller 108 attends to processing according to the program 116 of the driver 103 for information recording. This processing resumes background formatting as shown in FIG. 3C. That is, the resuming of background formatting starts by recording dummy data from the position of the LWA (i.e., the TLO start address). When the optical disk 104 is to be taken out, the host apparatus 115 issues a request for formatting suspension. In response to the request for formatting suspension, the drive unit 102 starts recording a TSA2, a TSTA, and a TLO from the new LWA before the discharge of the optical disk 104 (corresponding to a second resuming unit).

Figure 5:
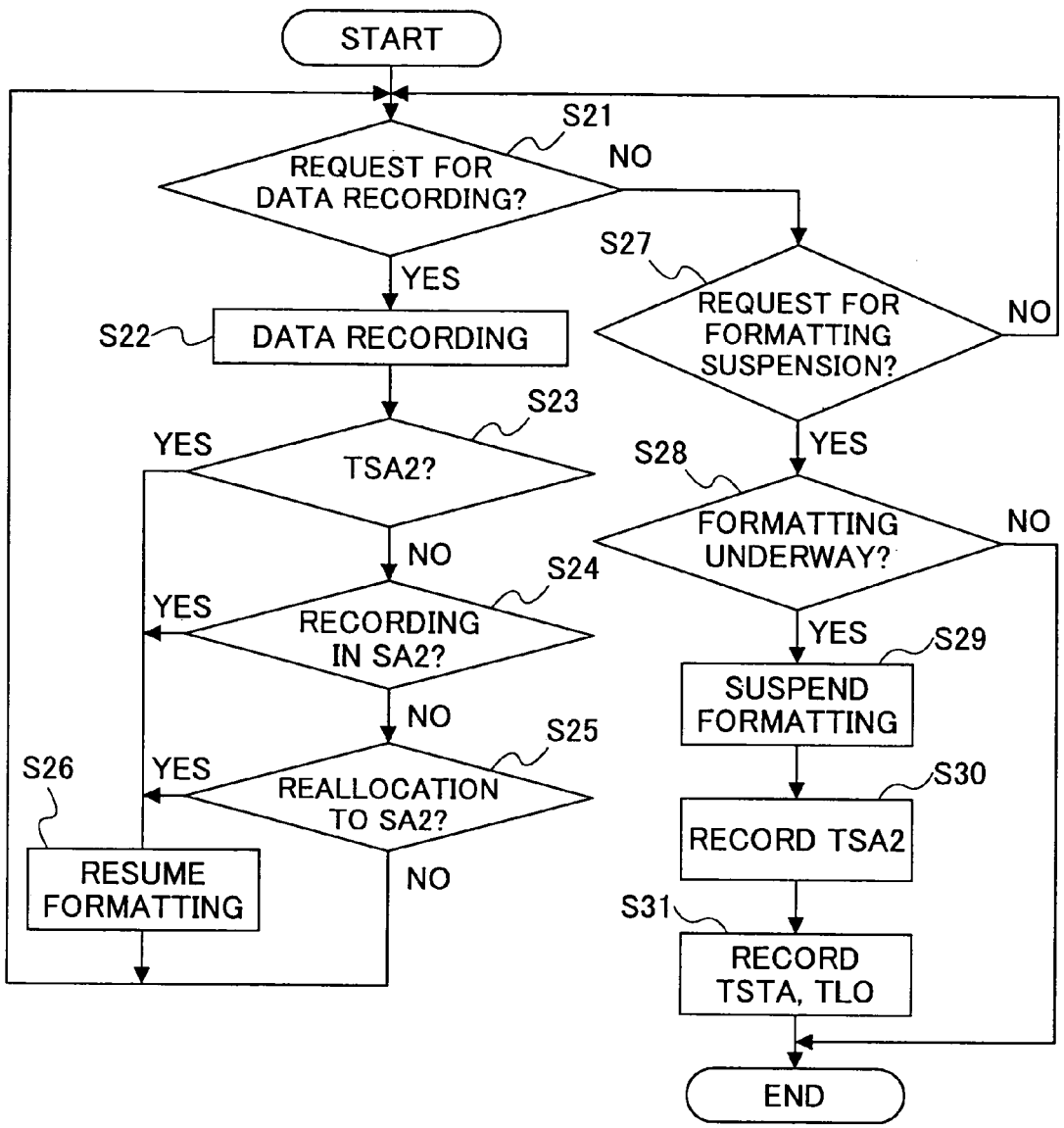
FIG. 5 is a flowchart showing a process of resuming background formatting performed by the controller according to the driver program for information recording.

FIG. 5 is a flowchart showing a process of resuming background formatting performed by the controller 108 according to the program 116 of the driver 103 for information recording. This process will be described in the following.

When a data recording request is issued from a user (step S21), data is recorded (step S22). If an area requested by the user for data recording is reallocated to the SA2, data is recorded in the SA2.

A check is then made as to whether the requested address is in the TSA2 (step S23). If it is in the TSA2 (Yes at step S23), background formatting is resumed (step S26).

If the requested address is not in the TSA2 (No at step S23), a check is further made as to whether the requested address has been reallocated to the SA2 (step S24). If it has been reallocated to the SA2 (Yes at step S24), background formatting is resumed (step S26).

If the check at step S24 finds that the requested address has not been reallocated to the SA2 (No at step S24), a check is further made as to whether recording on the requested address has brought about reallocation to the SA2 (step S25). If such reallocation to the SA2 has occurred (Yes at step S25), background formatting is resumed (step S26).

If it is ascertained at step S21 that there is no data recording request from the user (No at step S21), a check is made as to whether a request for formatting suspension is made (step S27). If the request for formatting suspension has been made (Yes at step S27), it is checked whether background formatting is underway (step S28).

If the check does not find that background formatting is underway, processing is brought to an end (No at step S28). If background formatting is underway (Yes at step S28), the background formatting is suspended (step S29). Then, the TSA2 is newly recorded from the position of the LWA (step S30), and the TSTA and the TLO are recorded following the TSA2 (step S31) prior to the closure of the processing.

Reproduction

Figure 6:
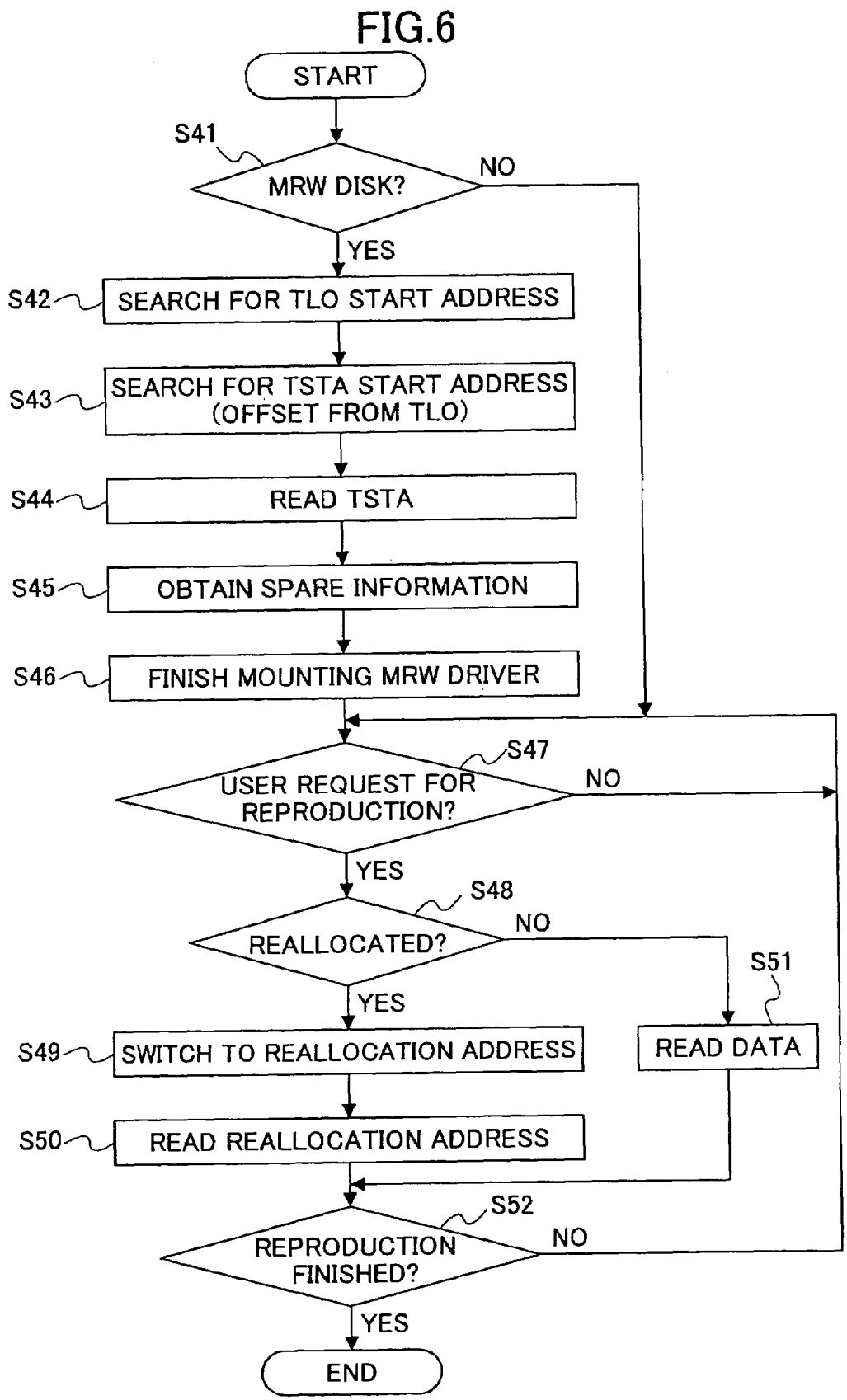
FIG. 6 is a flowchart showing a process of reproducing data from an optical disk.

FIG. 6 is a flowchart showing a process of reproducing data from an optical disk.

In reproduction, the drive unit 102 having a conventional configuration and an MRW driver (reader driver) work together to read data recorded on the optical disk 104 that is an MRW disk.

The controller 108 operating based on the program 116 of the driver 103 for information recording checks whether the optical disk 104 is an MRW disk (step S41). This check is made by referring to a GAA (see FIG. 7) included in the DA of the optical disk.

If the check finds that the optical disk 104 is not an MRW disk (No at step S41), reproduction is commenced after awaiting a user request for reproduction (steps S49–S52).

If it is ascertained that the optical disk 104 is an MRW disk (Yes at step S41), search for a TLO start address (step S42), search for a TSTA start address (step S43), and reading of the TSTA (step S44) are performed, thereby obtaining the TSA and the TSA2 functioning as spare information (step S45). The mounting of the MRW driver is then completed (step S46). Reproduction starts after awaiting a user request for reproduction (step S49–S52).

During reproduction, a check is made as to whether there is any reallocated data in the DA (step S48). If there is no reallocated data, reproduction is continued until to the end. (step S52).

If there is reallocated data in the DA, conversion to a reallocation address is made (step S49). The reallocation address is then read (step S50), and reproduction is continued until to the end (step S52).

Further, the present invention is not limited to these embodiments, but various variations and modifications may be made without departing from the scope of the present invention.

The present application is based on Japanese priority application No. 2002-299335 filed on Oct. 11, 2002, Japanese priority application No. 2002-308308 filed on Oct. 23, 2002, and Japanese priority application No. 2003-325195 filed on Sep. 17, 2003, with the Japanese Patent Office, the entire contents of which are hereby incorporated by reference.

What is claimed is:

1. An apparatus for recording information comprising:
an information recording unit adapted to record data on an optical recording medium having a user data area for recording user requested data and having a predetermined spare area for reallocating data in an area of the user data area containing a defect, wherein the user data area is arranged to extend from a radially inner area of the recording medium to a radially outer area of the recording medium, and wherein the predetermined spare area is arranged to be recorded at a radially outer area of the recording medium that is separated from recorded data in the user data area by unrecorded data;
a data reallocating unit which is adapted to reallocate data in an area of the user data area containing a defect to the predetermined spare area;
a temporary spare area recording unit which is adapted to generate a first temporary spare area in a portion of the user data area that is free from defects by copying the reallocated data from the predetermined spare area to the portion of the user data area that is free from defects, wherein the first temporary spare area is recorded at a portion of the user data area that does not include user data; and
an updating unit which is adapted to record a second temporary spare area by copying the reallocated data from the predetermined spare area to another portion of the user data area in response to a data change in one of the first temporary spare area and the predetermined spare area, wherein the second temporary spare area is recorded at a portion of the user data area that does not include user data.

2. The apparatus of claim 1, wherein the updating unit includes a first updating unit which is adapted to record the second temporary spare area when the data change is caused by overwriting of the first temporary spare area by user data.

3. The apparatus of claim 1, wherein the updating unit includes a second updating unit which is adapted to record the second temporary spare area when the data change is caused by recording on the predetermined spare area to which a recording area requested by a user has been reallocated.

4. The apparatus of claim 1, wherein the updating unit includes a second updating unit which is adapted to record the second temporary spare area when the data change is caused by recording on the predetermined spare area in response to a detection of a defect in the user data area.

5. The apparatus of claim 1, wherein the recording medium complies with a DVD+MRW standard, the predetermined spare area being a Spare Area 2 and the temporary spare area being a Temporary Spare Area 2, wherein the updating unit newly records the Temporary Spare Area 2 following a last written address in response to the data change in the Temporary Spare Area 2, followed by recording a Temporary Secondary Table Area and a Temporary Lead Out.

6. The apparatus of claim 1, wherein the recording medium complies with a DVD+MRW standard, the predetermined spare area being a Spare Area 2 and the temporary spare area being a Temporary Spare Area 2, wherein the updating unit newly records the Temporary Spare Area 2 following a last written address in response to the data change in the Spare Area 2, followed by recording a Temporary Secondary Table Area and a Temporary Lead Out.

7. The apparatus of claim 1, wherein the updating unit is adapted to record the second temporary spare area in response to a user request for ejection of the recording medium.

8. The apparatus of claim 1, wherein the updating unit is adapted to record the second temporary spare area in response to a user request for formatting suspension.

9. An apparatus for recording information, comprising:
an information recording unit adapted to record data on an optical recording medium having a user data area for recording user requested data and having a predetermined spare area for reallocating data in an area of the user data area containing a defect, wherein the user data area is arranged to extend from a radially inner area of the recording medium to a radially outer area of the recording medium, and wherein the predetermined spare area is arranged to be recorded at a radially outer area of the recording medium that is separated from recorded data in the user data area by unrecorded data;
a background formatting unit adapted to carry out formatting of the recording medium in the background;
a background formatting resumption unit adapted to resume the background formatting after a suspension of formatting when the recording medium is partially formatted;
a data reallocating unit adapted to reallocate data in an area of the user data area containing a defect to the predetermined spare area; and
a temporary spare area recording unit adapted to generate a temporary spare area in a portion of the user data area that is free from defects by copying the reallocated data from the predetermined spare area to the portion of the user data area that is free from defects on receipt of a request for a suspension of formatting, wherein the temporary spare area is recorded at a portion of the user data area that does not include user data,
wherein the background formatting resumption unit is adapted to resume the formatting in response to a data change in one of the temporary spare area and the predetermined spare area.

10. The apparatus of claim 9, wherein the background formatting resumption unit includes a first resuming unit adapted to resume the formatting when the data change is caused by overwriting of the temporary spare area by user data.

11. The apparatus of claim 9, wherein the background formatting resumption unit includes a second resuming unit adapted to resume the formatting when the data change is caused by recording on the predetermined spare area to which a recording area requested by a user has bean reallocated.

12. The apparatus of claim 9, wherein the background formatting resumption unit includes a second resuming unit adapted to resume the formatting when the data change is caused by recording on the predetermined spare area in response to a detection of a defect in the user data area.

13. The apparatus of claim 9, wherein the recording medium complies with a DVD+MRW standard, the predetermined spate area being a Spare Area 2 and the temporary spare area being a Temporary Spare Area 2, wherein the background formatting resumption unit is adapted to resume the formatting in response to the data change in the Temporary Spare Area 2.

14. The apparatus of claim 9, wherein the recording medium complies with a DVD+MRW standard, the predetermined spare area being a Spare Area 2 and the temporary spare area being a Temporary Spare Area 2, wherein the background formatting resumption unit is adapted to resume the formatting in response to the data change in the Spare Area 2.

15. An system for recording information comprising:
an information recording apparatus adapted to record data on an optical recording medium having a user data area for recording user requested data and having a predetermined spare area for reallocating data in an area of the user data area containing a defect, wherein the user data area is arranged to extend from a radially inner area of the recording medium to a radially outer area of the recording medium, and wherein the predetermined spare area is arranged to be recorded at a radially outer area of the recording medium that is separated from recorded data in the user data area by unrecorded data;
a host apparatus adapted to instruct the information recording apparatus to record data on the recording medium, wherein the information recording apparatus and the host apparatus together include:
an information recording unit adapted to record data on the recording medium;
a data reallocating unit adapted to reallocate data in an area of the user data area containing a defect to the predetermined spare area;
a temporary spare area recording unit adapted to generate a first temporary spare area in a portion of the user data area that is free from defects by copying the reallocated data from the predetermined spare area to the portion of the user data area that is free from defects, wherein the first temporary spare area is recorded at a portion of the user data area that does not include user data; and
an updating unit adapted to record a second temporary spare area by copying the reallocated data from the predetermined spare area to another portion of the user data area in response to a data change in one of the first temporary spare area and the predetermined spare area, wherein the second temporary spare area is recorded at a portion of the user data area that does not include user data.

16. An system for recording information comprising:
an information recording apparatus adapted to record data on an optical recording medium having a user data area for recording user requested data and having a predetermined spare area for reallocating data in an area of the user data area containing a defect, wherein the user data area is arranged to extend from a radially inner area of the recording medium to a radially outer area of the recording medium, and wherein the predetermined spare area is arranged to be recorded at a radially outer area of the recording medium that is separated from recorded data in the user data area by unrecorded data;
a host apparatus adapted to instruct the information recording apparatus to record data on the recording medium, wherein the information recording apparatus and the host apparatus together include:
an information recording unit adapted to record data on the recording medium;
a background formatting unit adapted to carry out formatting of the recording medium in the background;
a background formatting resumption unit adapted to resume the background formatting when the recording medium is partially formatted after a suspension of formatting;
a data reallocating unit adapted to reallocate data in an area of the user data area containing a defect to the predetermined spare area; and
a temporary spare area recording unit adapted to generate a temporary spare area in a portion of the user data area that is free from defects by copying the reallocated data from the predetermined spare area to the portion of the user data area that is free from defects on receipt of a request for a suspension of formatting, wherein the temporary spare area is recorded at a portion of the user data area that does not include user data,
wherein the background formatting resumption unit is adapted to resume the formatting in response to a data change in one of the temporary spare area and the predetermined spare area.

17. A method of recording information comprising:
an information recording step of recording data on a recording medium having a user data area for recording of user requested data and having a predetermined spare area for reallocating data in an area of the user data area containing a defect, wherein the user data area is arranged to extend from a radially inner area of the recording medium to a radially outer area of the recording medium, and wherein the predetermined spare area is recorded at a radially outer area of the recording medium that is separated from recorded data in the user data area by unrecorded data;
a data reallocating step of reallocating data in an area of the user data area containing a defect to the predetermined spare area;
a temporary spare area recording step of generating a first temporary spare area in a portion of the user data area that is free from defects by copying the reallocated data from the predetermined spare area to the portion of the user data area that is free from defects, wherein the first temporary spare area is recorded at a portion of the user data area that does not include user data; and
an updating step of recording a second temporary spare area be copying the reallocated data from the predetermined spare area to another portion of the user data area in response to a data change in one of the first temporary spare area and the predetermined spare area, wherein the second temporary spare area is recorded at a portion of the user data area that does not include user data.

18. A method of recording information comprising:
an information recording step of recording data on a recording medium having a user data area for recording of user requested data and having a predetermined spare area for reallocating data in an area of the user data area containing a defect, wherein the user data area is arranged to extend from a radially inner area of the recording medium to a radially outer area of the recording medium, and wherein the predetermined spare area is recorded at a radially outer area of the recording medium that is separated from recorded data in the user data area by unrecorded data;
a background formatting step of carrying out formatting of the recording medium in the background;
a background formatting resumption step of resuming the background formatting after a suspension of formatting when the formatting recording medium is partially formatted;

a data reallocating step of reallocating data in an area of the user data area containing a defect to the predetermined spare area; and a temporary spare area recording step of generating a temporary spare area in a portion of the user data area that is free from defects by copying the reallocated data from the predetermined spare area to the portion of the user data area that is free from defects, wherein the temporary spare area is recorded at a portion of the user data area that does not include user data, wherein the background formatting resumption step if in response to a data change in one of the temporary spare area and the predetermined spare area.

19. A computer-readable recording medium having a program embodied therein for causing a computer to carry out the method of claim 17 or 18.

* * * * *